United States Patent [19]

Kiya

[11] Patent Number: 4,776,247
[45] Date of Patent: Oct. 11, 1988

[54] NUMERICAL CONTROL SYSTEM
[75] Inventor: Nobuyuki Kiya, Hachioji, Japan
[73] Assignee: Fanuc Ltd, Minamitsuru, Japan
[21] Appl. No.: 140,938
[22] Filed: Dec. 28, 1987

Related U.S. Application Data

[63] Continuation of Ser. No. 854,650, filed as PCT JP85/00453, Aug. 15, 1985 published as WO86/01315, Feb. 27, 1986 abandoned.

[30] Foreign Application Priority Data

Aug. 18, 1985 [JP] Japan .................. 59-172129

[51] Int. Cl.$^4$ .............. B23B 7/00; B23B 21/00;
                                B23B 29/24; G05B 19/18
[52] U.S. Cl. ..................... 82/2 B; 82/21 B;
       82/25; 318/572; 318/574; 364/167.01;
                                 364/474.21; 407/67
[58] Field of Search .......... 82/2 B, 21 B, 25;
       318/567, 572, 574; 364/167, 170, 474; 407/67,
                                                  68

[56] References Cited

U.S. PATENT DOCUMENTS

| | | | |
|---|---|---|---|
| 1,821,743 | 9/1931 | Dreyhaupt | 82/25 |
| 3,282,138 | 11/1966 | Stockmann et al. | 82/2 B |
| 3,492,467 | 1/1970 | Caban et al. | 82/2 B |
| 3,726,162 | 4/1973 | Sato | 82/2 R |
| 4,176,396 | 11/1979 | Howatt | 364/474 |
| 4,424,569 | 1/1984 | Imazeki et al. | 318/625 |
| 4,549,270 | 10/1985 | Fukumura et al. | 82/2 B |
| 4,564,914 | 1/1986 | Ballough et al. | 364/475 |
| 4,572,998 | 2/1986 | Nozawa et al. | 318/572 |
| 4,574,666 | 3/1986 | Habegger | 82/2.5 |
| 4,608,645 | 8/1986 | Niwa et al. | 364/474 |
| 4,612,833 | 9/1986 | Scee | 82/18 |

FOREIGN PATENT DOCUMENTS

| | | | |
|---|---|---|---|
| 126046 | 7/1983 | Japan | 364/474 |
| 71103 | 4/1985 | Japan | 82/25 |

Primary Examiner—Frederick R. Schmidt
Assistant Examiner—William E. Terrell
Attorney, Agent, or Firm—Staas & Halsey

[57] ABSTRACT

A numerical control system has a tool holder which supports tools ... attached to at least two intersecting sides, preferably three sides of a rectangular shape. The tool holder is movable along plural axes, e.g., X and Y-axis directions. A memory circuit is provided for storing the positional data regarding the tips of the tools and a workpiece diameter when the tool holder is predetermined reference points. When a workpiece is to be machined by a selected tool, the data regarding the selected tool and the workpiece diameter are called from the memory circuit, the distance from the tool tip to the outer periphery of the workpiece is computed, and the tip of the tool is moved to the outer periphery of the workpiece. With this arrangement, tools can be changed quickly.

5 Claims, 2 Drawing Sheets

FIG. 3

(SETTING EXAMPLE ON CRT)    WORKPIECE DIAMETER

OFFSET
DIAMETER = 10.000

| Nō | X | Y | Z | GP |
|----|---|---|---|----|
| 01 | 30.000 | -5.000 | 0.000 | 1 |
| 02 | -10.000 | 13.213 | 10.321 | 2 |
| 03 | 15.321 | 0.500 | 15.210 | 3 |
| 04 | ⋮ | ⋮ | ⋮ | ⋮ |

TOOL NUMBER     DISTANCE FROM WORKPIECE CENTER TO TOOL TIP     GROUP NUMBER

NUMERICAL CONTROL SYSTEM

This is a continuation of co-pending application Ser. No. 854,650 filed on as PCT JP85/00453 on Aug. 15, 1985 published as W086/01315 on Feb. 27, 1986, now abandoned.

BACKGROUND OF THE INVENTION

The present invention relates to a numerical control system for automatically controlling a lathe based on numerical information.

Lathes that are numerically controlled include ordinary lathes and turret lathes. Many such numerically controlled lathes have tool holders for holding cutting tools, the tool holders being disposed in the longitudinal direction of a workpiece, i.e., the Z-axis direction. In those lathes of the type in which the tool holder is turned for changing cutting tools, the tools are attached to the tool holder such that the tip of each of the tools is in the same position with respect to the workpiece when the tool holder is turned for a tool exchange, so that the tools can be changed conveniently. Thus, when the tool used in a preceding process is retracted prior to cutting a workpiece and the tool holder is turned to use a tool in the next process, the values of the position of the tool tip on the X and Z-axes can be used in an NC program as value settings in the coordinate system in the next process.

In the aforesaid procedure, the tool that has been used to cut the workpiece in the preceding process is retracted for a tool exchange, the tool holder is turned to select a tool in the following process, and the selected tool is advanced to a position for cutting the workpiece and moved into contact with the workpiece to cut the workpiece in the next process. Therefore, where different processes are involved, the tool holder is retracted, turned, and advanced each time tools are changed, during that time no cutting operation is effected, resulting in a disadvantage in which the cutting procedure is time-consuming.

The present invention has been made in an effort to solve the aforesaid conventional drawback.

SUMMARY OF THE INVENTION

It is an object of the present invention to provide a novel numerical control system for a cutting operation, which is capable of immediately positioning a new tool for a next cutting procedure without turning a tool holder when tools are changed.

To obtain the present invention, there is provided a numerical control system having a tool holder movable in plural axes, and means for storing data on the positions of the tips of the respective tools and a workpiece diameter when the tool holder is at a reference point. The arrangement is such that when the workpiece is to be cut by a selected one of the tools, the data of the selected tool and the workpiece diameter are retrieved from memory, the distance from the tool tip to the outer periphery of the workpiece is computed, and the tool tip is moved to the outer periphery of the workpiece.

There is also provided a numerical control system wherein there are a plurality of tools on each of the sides of a tool holder. The positional data regarding the tip of each tool is stored as a geometric offset amount and a wear offset amount.

As described above in detail, a workpiece is disposed so that a tool holder which surrounds the workpiece. The positions of the tips of the respective tools at various reference points are stored in a memory, and the stored values and the distance to the outer periphery of the workpiece are computed to move the tools. When changing tools and cutting the workpiece with a different tool, the tool to be used in the next process can be positioned on the workpiece immediately after the tool used in the preceding process has left the workpiece. Therefore, the time required for a tool exchange is reduced, and the efficiency of a cutting operation is improved.

BRIEF DESCRIPTION OF THE DRAWINGS

FIG. 3 is a front elevational view of a display screen of a numerical control apparatus.

DESCRIPTION OF THE PREFERRED EMBODIMENT

Figure 1:
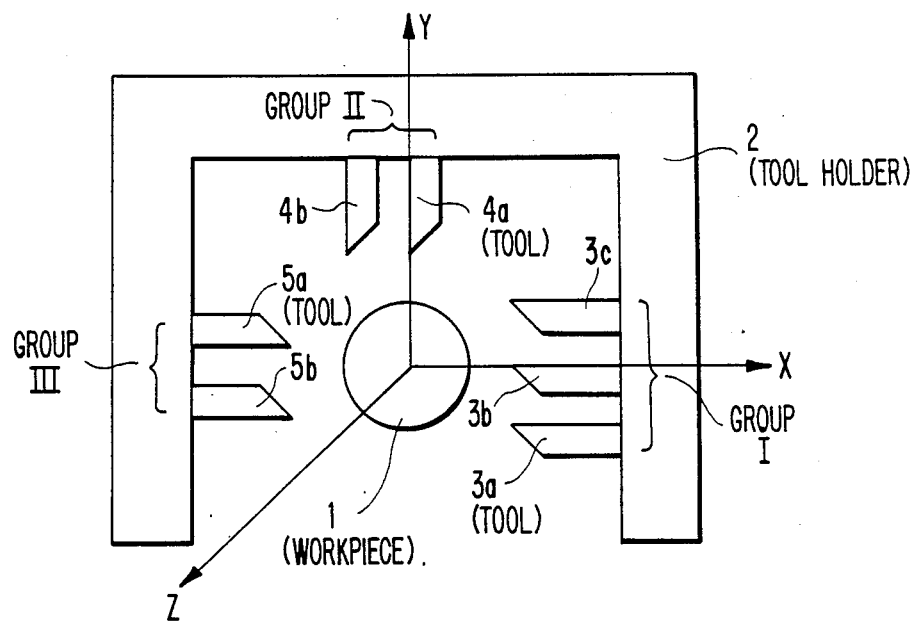
FIG. 1 is a view explaining an arrangement of a tool holder and tools in an embodiment of a numerical control system according to the present invention.
Figure 2A:
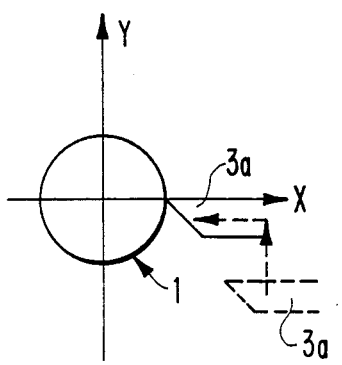
FIGS. 2(A) through 2(C) are diagrams explaining positional relationships between a workpiece and a tool.
Figure 2B:
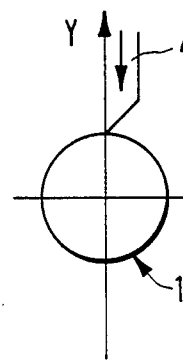
Figure 2C:
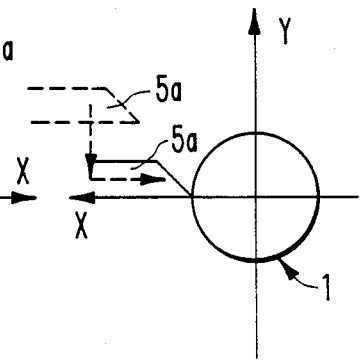

An embodiment of the present invention will now be described in specific detail with reference to the drawings. FIG. 1 is a view of an arrangement of a tool holder and tools according to an embodiment of the present invention. Designated at 1 is a workpiece to be cut, which is attached to a chuck on a spindle and is rotatable with the spindle. It is assumed that the direction of the spindle is taken as the Z-axis, the horizontal direction as the X-axis, and the vertical direction as they Y-axis. A channel-shaped tool holder 2 has three sides surrounding a workpiece 1 and is attached to a lathe such that the tool holder opens in a downward direction. Tools 3a, 3b, 3c; 4a, 4b; and 5a, 5b for cutting the workpiece 1 are attached, respectively, to the three sides of the tool holder 2. The tips of the respective tools are directed toward the center of the workpiece 1. The tools 3a, 3b and 3c that are directed opposite to the arrow of the X-axis of the workpiece 1 are regarded as group I, the tools 5a and 5b oriented in the same direction as the arrow of the X-axis are regarded as group III, and the tools 4a and 4b that are directed opposite to the arrow of the Y-axis are regarded as group II. Therefore, as illustrated in FIG. 2(A), when cutting the workpiece 1, the tool 3a belonging to group I has its tip moved to the X axis on which Y=0, and then moved into contact with the outer periphery of the workpiece 1. The workpiece 1 can be cut by varying the values on the X and Z-axes to desired values. the tool 5a in group III is also moved so that its tip is in contact with the outer periphery of the workpiece 1 on the X-axis, and the values on the X and Z-axes are varied to the desired values to cut the workpiece 1, as shown in FIG. 2(C). As shown in FIG. 2(B), the tool 4a in group II has its tip lowered along the Y-axis where X=0 and contacts the outer periphery of the workpiece 1. The workpiece 1 is cut by varying the values on the Y and Z-axes.

Operation of the present invention will be described below.

According to the present invention, geometric offset amounts are first established. More specifically, distances are established from the center (xo, yo) of the tip position of each tool when the tool holder 2 is positioned at reference points on the respective axes of a lathe.

In establishing the geometric offset amounts, the values of X for grpoups I and III and the value of Y for group II are set as positive, and the other values are combined with respective appropriate signs.

Then, wear offset amounts are established, i.e., compensations due to wear on the respective tools are established. The compensations are set such that the direction in which the tools are elongated is regarded as positive and the direction in which the tools are shortened is regarded as negative for X in groups I and III and for Y in group II (in FIG. 1) and the other compensations are combined with the signs opposite to those for the geometric offset amounts. Thereafter, a workpiece diameter is set.

During the machining operation on the lathe, the group names to which the respective tools belong, the geometric offset amount and wear offset amount for each tool, and the workpiece diameter are stored in a memory in an NC apparatus. The data stored in the memory can be displayed on a display screen of the NC apparatus, and the numerical values of the stored data can be added, revised, and deleted as desired.

FIG. 3 is a front elevational view showing a workpiece diameter (DIAMETER), tool numbers (NO), group numbers (GP) to which the tools belong, and geometric offset amounts for the respective tools (except for the wear offset amounts), as displayed on the display screen of the NC apparatus.

For programming a lathe machining procedure, the tool number of a tool to be used is specified using a T code (tool selection). When the workpiece is cut using the machining program, and a required tool is selected and specified with a T code, the CPU in the NC apparatus calls the geometric offset amount for the selected tool, the wear offset amount for the selected tool, the group number to which the selected tool belongs, and the workpiece diameter from the memory. These data items and the distance that the tool tip traverses from the present position to the outer periphery of the workpiece 1 are computed, and the tool holder 2 is moved to bring the tip of the selected tool into contact with the outer periphery of the workpiece for positioning the tool, as shown in FIGS. 2(A) through 2(C).

When the cutting process using the selected tool is completed and a next tool to be used is specified by a T code, a process similar to the aforesaid process is repeated to move the tip of the selected tool to the outer periphery of the workpiece.

While in the above embodiment the tip position data for each tool is represented by a geometric offset amount and a wear offset amount, the coordinate values of the tip of each tool at the time tool holder 2 is at the reference points may be stored, and the distance from the tool tip to the outer periphery of the workpiece may be computed using these coordinate values. Although the tool holder in the above embodiment is of a rectangular shape having three sides, a tool holder of an inverted L shape having two sides may also be employed.

A plurality of lathes to which the present invention is applied may be combined with a robot which supplies workpieces and palletizes them, so that workpieces of different kinds can quickly be machined automatically.

I claim:

1. A numerical control lathe, comprising:
   a tool holder having at least two sides which intersect, said at least two sides of said tool holder each holding a cutting tool;
   means for moving said tool holder in the directions of the three mutually orthogonal X, Y and Z axes;
   means for supporting and rotating a workpiece to be machined by the tools attached to said tool holder about an axis extending in one of said directions, one said tool extending toward the workpiece in a second of said directions, and another said tool extending toward the workpiece in the third of said directions;
   memory means for storing positional data relating to the position of the tips of the respective tools, including tool geometric offset and near offset amounts, and the diameter of the workpiece when said tool holder is at a reference point;
   means for selecting one of the tools to be used; and
   means for reading selected tool data and the diameter of said workpiece from said memory means, for computing the distance from the tip of the selected tool to the outer periphery of the workpiece, and for moving the tool holder to move the tip of the selected tool to the outer periphery of the workpiece, when the workpiece is to be machined by the selected tool.

2. A numerical control system according to claim 1, wherein a plurality of tools are attached to each of the sides of said tool holder.

3. A numerical control system according to claim 1, wherein the tool attached to each side of said tool holder is detachable.

4. A numerical control system according to claim 2, wherein said tool holder has an L shape.

5. A numerical control system according to claim 2, wherein said tool holder has a rectangular shape with three sides.

* * * * *

UNITED STATES PATENT AND TRADEMARK OFFICE
CERTIFICATE OF CORRECTION

PATENT NO. : 4,776,247
DATED : OCTOBER 11, 1988
INVENTOR(S) : NOBUYUKI KIYA

It is certified that error appears in the above-identified patent and that said Letters Patent is hereby corrected as shown below:

FRONT PAGE [57] ABSTRACT, line 2, delete "...".

Col. 2, line 51, "the" (second occurrence) should be --The--;

line 69, "grpoups" should be --groups--.

Signed and Sealed this

Seventh Day of March, 1989

Attest:

DONALD J. QUIGG

Attesting Officer

Commissioner of Patents and Trademarks